United States Patent
Goto et al.

[11] Patent Number: 5,212,375
[45] Date of Patent: May 18, 1993

[54] CAMERA FOCUS DETECTION SYSTEM USING HOLOGRAPHIC BEAM SPLITTER

[75] Inventors: Hisashi Goto, Musashino; Tsutomu Uzawa, Hachiouji; Yoshihiro Kawano, Hachiouji; Hiroyuki Kurita, Hachiouji; Hideaki Yoshida, Hachiouji; Akira Hasegawa, Mitaka; Kimihiko Nishioka, Hachiouji, all of Japan

[73] Assignee: Olympus Optical Co., Ltd., Tokyo, Japan

[21] Appl. No.: 772,243

[22] Filed: Oct. 7, 1991

[30] Foreign Application Priority Data

Oct. 9, 1990 [JP] Japan .................................. 2-271621
Oct. 11, 1990 [JP] Japan .................................. 2-272913

[51] Int. Cl.⁵ ........................................... G01J 1/20
[52] U.S. Cl. .................................. 250/201.7; 359/15; 354/407
[58] Field of Search ............... 250/201.7, 201.8, 216, 250/204; 359/15, 13; 354/406, 407, 466

[56] References Cited

U.S. PATENT DOCUMENTS

| | | |
|---|---|---|
| 4,255,032 | 3/1981 | Matsumoto et al. ............... 359/13 |
| 4,294,529 | 10/1981 | Sato et al. ........................... 354/466 |
| 4,945,529 | 7/1990 | Ono et al. .......................... 359/15 |
| 4,950,879 | 8/1990 | Ishid et al. ....................... 250/201.8 |
| 5,016,954 | 5/1991 | Onayama et al. ............... 250/201.1 |

Primary Examiner—David C. Nelms
Assistant Examiner—K. Shami
Attorney, Agent, or Firm—Cushman, Darby & Cushman

[57] ABSTRACT

An imaging system having a focus detecting device performs focus detection by detecting an output signal indicative of intensity distribution of light derived from a light-receiving element, in which at least one holographic optical element is arranged on the object side of a primary imaging plane to form an image on the light-receiving element. Thus, the imaging system has significant advantages in practical use that the arrangement is simple and the camera body is made compact.

4 Claims, 7 Drawing Sheets

PORTIONS SUBJECTED
TO ACTION OF HOE

CAMERA FOCUS DETECTION SYSTEM USING HOLOGRAPHIC BEAM SPLITTER

BACKGROUND OF THE INVENTION a) Field of the Invention

This invention relates to an imaging system having a focus detecting device used for photographic cameras, cinecameras, video cameras, etc.

b) Description of the Prior Art

In the past, what is called a TTL system, which is free of parallax, has been often adopted as a focus detecting device for single-lens reflex cameras. In most cases, to facilitate the calculations of the amounts of a front focus and a rear focus in particular, the focus detecting device of a so-called phase correlation scheme is used in which photoelectric conversion means (light-receiving elements) are subjected to the intensity distributions of light of two images formed by two beams of light passing along two different optical paths or passing through different regions in the same optical system and focus detection is performed by detecting the phase difference between output signals indicative of the intensity distributions which are derived from the photoelectric conversion means.

An example of the conventional focus detecting device of this type is schematically shown in FIG. 1 with reference to the optical system of the device which is incorporated in the single-lens reflex camera and commercialized. This optical system comprises a photographic lens 1; a swing-up type instant-return mirror 3 composed of a half mirror, pivotally mounted in the mirror box 2; a sub-mirror 4 pivotally mounted on the back surface of the instant-return mirror 3, located perpendicular to the instant-return mirror 3 when the instant-return mirror 3 is set at the lower position (shown) and coming in close contact with the back surface of the instant-return mirror 3 when the instant-return mirror 3 is shifted to the upper position; an imaging plane 5 (a film plane in the case of a camera for photography with silver halide) arranged behind the sub-mirror 4, on the rear face of the mirror box 2; a field stop 6 arranged, on the optical path of reflection from the sub-mirror 4, at a plane equivalent optically to the imaging plane 5; a condenser lens 7 arranged adjacent to the field stop 6; a mirror 8 arranged behind the condenser lens 7; an aperture stop 9 arranged behind the mirror 8, having a pair of apertures juxtaposed normal to the plane of the figure at an interval which makes it possible to secure focusing accuracy; a pair of separator lenses (reimaging lenses) 10 juxtaposed, normal to the plane of the figure, behind the aperture stop 9 having the pair of apertures, respectively; a light-receiving element 11 arranged at the imaging position brought about by the separator lenses 10; a focusing screen 12 arranged, on the optical path of reflection from the instant-return mirror 3, at a plane equivalent optically to the imaging plane 5; a condenser lens 13 disposed in front of the focusing screen 12; a field stop 14 disposed at the same position as the focusing screen 12; a pentagonal roof prism 15 whose entrance surface is positioned in rear of the focusing screen 12; and an eyepiece 16 arranged behind the exit surface of the pentagonal roof prism 15. Of these components, the photographic lens 1 and imaging plane 5 constitute a photographing optical system. Further, the instant-return mirror 3, submirror 4, field stop 6, condenser lens 7, mirror 8, aperture stop 9 with a pair of apertures, separator lenses 10 in a pair, and light-receiving element 11 constitute a focus detecting optical system on a phase correlation scheme of performing the focus detection by making use of beams of light traversing the different areas of the photographic lens 1 to detect the relative positional relationship of a pair of images of an object. Also, the instant-return mirror 3, condenser lens 13, focusing screen 12, field stop 14, pentagonal roof prism 15, and eyepiece 16 constitute a finder optical system.

Specifically, when the instant-return mirror is set at the upper position, a primary image $I_0$ of an object point O is formed on the imaging plane 5 by the photographic lens 1. On the other hand, when the instant-return mirror 3 is set at the lower position, part of the imaging beams of light through the photographic lens 1 is transmitted by the instant-return mirror 3 and conducted to the focus detecting optical system, while the remainder, reflected from the instant-return mirror 3, is conducted to the finder optical system.

For the focus detecting optical system, the light beam transmitted through the instant-return mirror 3 is reflected at the sub-mirror 4 so that a primary image $I_1$ of the object point O is formed on the field stop 6 and then, through the condenser lens 7, mirror 8, aperture stop 9 with a pair of apertures, and separator lenses 10 in a pair, a pair of secondary images $I_2$ and $I_3$ is formed on the light-receiving element 11.

As for the finder optical system, the light beam reflected from the instant-return mirror 3 is nearly collected by the condenser lens 13 so that a primary image $I_4$ of the object point 0, after being formed on the focusing screen 12, is converted into an orthographic image, together with the image of the field stop 14, by the pentagonal roof prism 15, the orthographic image being magnified through the eyepiece 16 for observation at an eyepoint EP.

In the focus detecting optical system, the image of an exit pupil P at the photographic lens 1 is formed on the aperture stop 9 in virtue of the condenser lens 7. By the pair of apertures of the aperture stop 9 and the pair of separator lenses 10, two beams of light traversing the different areas of the exit pupil P are conducted onto the light-receiving element 11 while holding a certain base length (the distance between the centers of the light beams).

The foregoing prior art, however, has encountered the problems that the arrangement is complicated and the volume occupied by the focus detecting optical system increases, with the result that the entire camera body becomes bulky.

Further, the imaging system having the focus detecting optical system includes the arrangement that a beam of light for focus detection is separated from the imaging optical system while the optical path directed toward the imaging plane is not blocked.

This arrangement is such that focusing can be performed during the photography and sharp picture images are brought about even when the photography is sequentially carried out. An example in which such an arrangement is realized is set forth in Japanese Patent Preliminary Publication No. Sho 57-168205 and shown in FIG. 2. Reference numeral 23 denotes a focusing prism disposed between the imaging lens system 1 and the imaging plane 5, having a half mirror 24 which is a light-splitting surface. In such an optical system, a convergent beam of light leaving the imaging lens 1 enters the prism 23 from an entrance surface 23a arranged nearly perpendicular to the optical axis so that part of the light beam is imaged at the imaging plane 5 and the remaining beam, after reflection from the half mirror 24, is reflected in sequence by the surfaces 23a and 23b of the prism 23, emerges from an exit surface configured at the same plane as the entrance surface 23a in a direction normal practically to the exit surface to travel nearly parallel to the optical axis of the imaging lens 1 as a beam of light utilized for focus detection, and forms an image of the object at a position nearly conjugate with the imaging plane 5. If, therefore, the photoelectric conversion device 11 is arranged at such an imaging position, the intensity distribution of the object image can be converted into an electrical signal for the focus detection. The preceding arrangement makes it possible to perform focusing during the photography and eliminate the effects of the irregularity of illuminance and the unevenness of spectral properties on the entire image surface because the half mirror 24 performs its function over the whole of an effective imaging light beam. Additionally, since the entire section of an axial light beam can be utilized as the light beam for detection, the focusing characteristic in the imaging plane 5 can be made equivalent to that in the detecting system, with the resultant improvement of the focusing accuracy.

This prior art, however, has the problems that the prism 23 splitting the light beam to be directed toward the photographic system and the focus detecting system is comprised of two prism elements and in addition, the coating of the half mirror 24 is applied to their cemented surface, so that the prism 23 is high in cost and complicated in structure.

SUMMARY OF THE INVENTION

It is, therefore, a primary object of the present invention to provide an imaging system having a focus detecting device on a phase correlation scheme which enables the arrangement to be simplified and the camera body to be compact.

Another object of the present invention is to provide an imaging system in which the beam of light can be split to be directed toward the photographic system and the focus detecting system with an arrangement which is low in cost and simple and in which focusing can be performed during the photography.

According to the present invention, the imaging system has a focus detecting device designed so that light-receiving elements are subjected to the intensity distributions of light of two images formed by two beams of light passing along two different optical paths or passing through different regions in the same optical system and focus detection is performed by detecting the phase difference between output signals indicative of the intensity distributions which are derived from the light-receiving elements, in which at least one holographic optical element is arranged, as a measure for conducting the two light beams to the light-receiving elements, closer to an object than a primary imaging plane.

Further, the imaging system according to the present invention is constructed so that at least one holographic optical element is arranged on the optical path of a photographic lens to split the beam of light into a plural number of light beams, in which at least one light beam, among the plural light beams, is conducted to an imaging element and at least another light beam is conducted to a focus detecting system.

The holographic optical element (which will be hereinafter referred to as HOE) has come to be recently used and is designed so that by applying a diffracting function of a hologram, it can be employed as a lens, mirror, light-splitting prism, etc. ("Practical Holographic Technology", Masane Suzuki, Optolonics, Chap. 7, Application to Hologram Optical Elements, Jul. 10, 1986). Japanese Patent Preliminary Publication Nos. Sho 63-200328 and Hei 1-311428 show examples used as beam splitting means. Since the HOE is employed only for recording the pattern of an interference light beam on the film plane, the structure is extremely simple. According to the foregoing arrangement, two light beam passing through different regions in the same optical system are bent in directions different from each other by a single HOE arranged closer to the object than the primary imaging plane to form two images on light-receiving elements and focus detection is performed by detecting the phase difference between output signals indicative of the intensity distributions of light which are derived from the light-receiving elements. Hence this arrangement dispenses with the need for the field stop, condenser lens, mirror, aperture stop, and separator lens disposed in the prior art, so that it is simplified and enables the camera body to be compact.

The HOE, which may be replicated in resins like plastics, is inexpensive and simple in structure. Thus, according to the above arrangement, the inexpensive and simple structure of a single HOE makes it possible to split the light beam into the photographic system and the focus detecting system and to perform focusing during the photography.

Also, since the zero-order transmitted light of the HOE produces little chromatic aberration, it is desirable that the light is conducted to the photographic optical system which has a small allowance of the chromatic aberration.

These and other objects as well as the features and the advantages of the present invention will become apparent from the following detailed description of the preferred embodiments when taken in conjunction with the accompanying drawings.

DETAILED DESCRIPTION OF THE PREFERRED EMBODIMENTS

Figure 1:
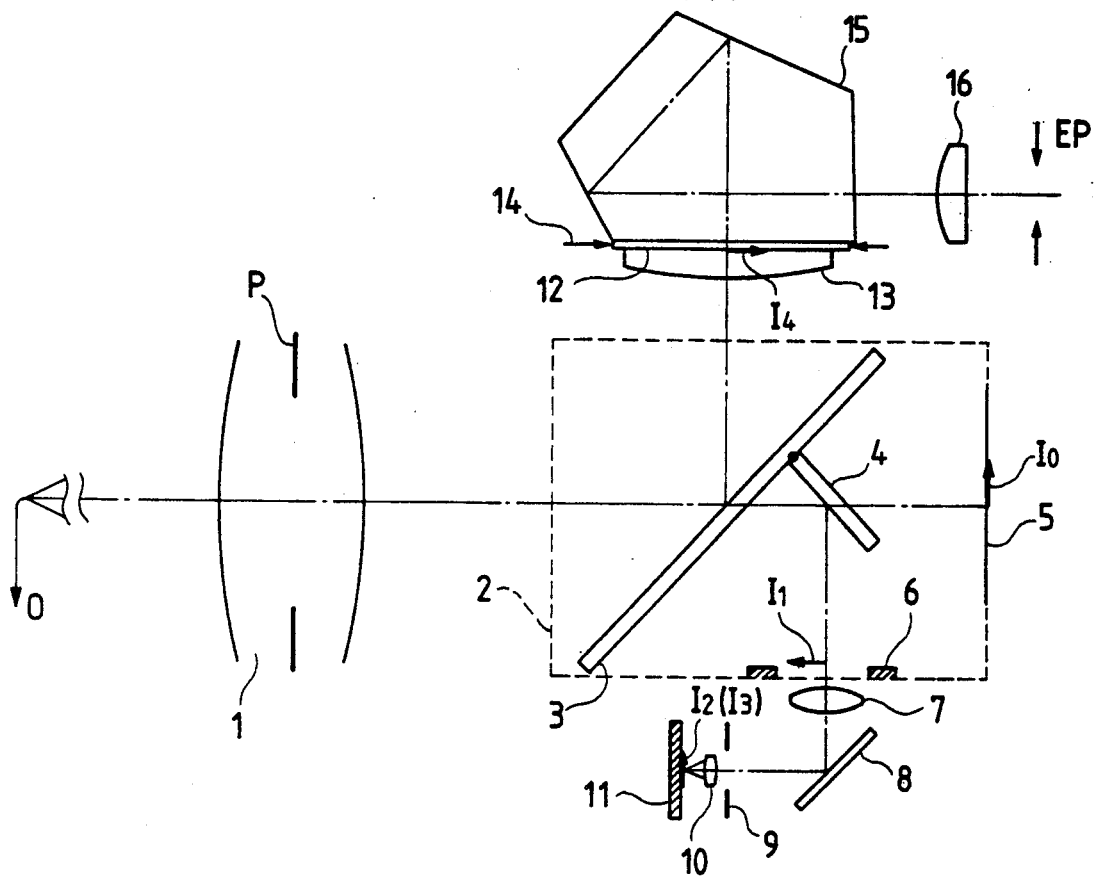
FIGS. 1 and 2 are views showing the optical systems of the prior art.
Figure 2:
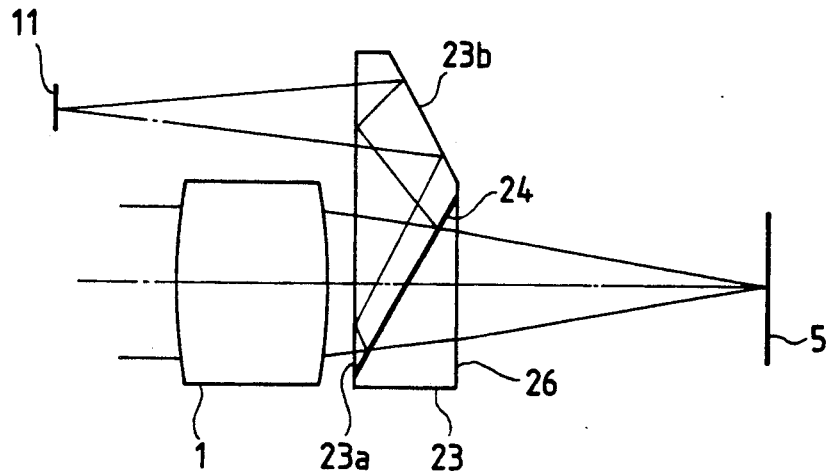

In accordance with the embodiments shown in the drawings, in which like numerals and symbols are used for like members with the prior art, the present invention will be explained in detail below.

Figure 3:
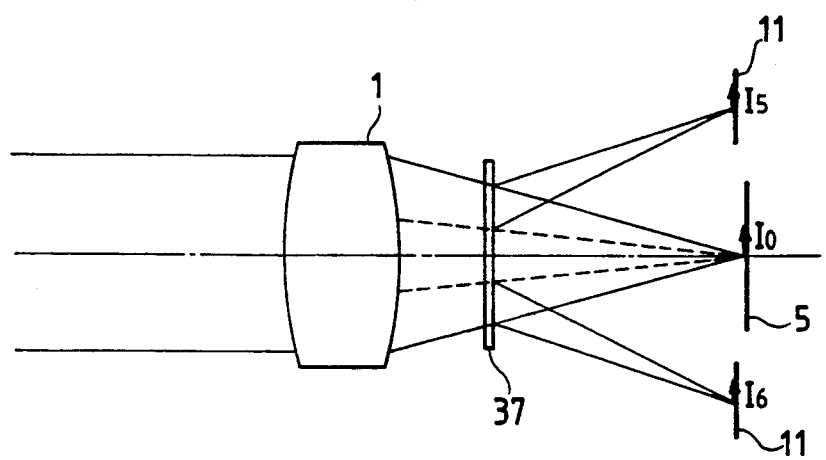
FIG. 3 is a schematic view of the optical system of a first embodiment of a focus detecting device according to the present invention.
Figure 4:
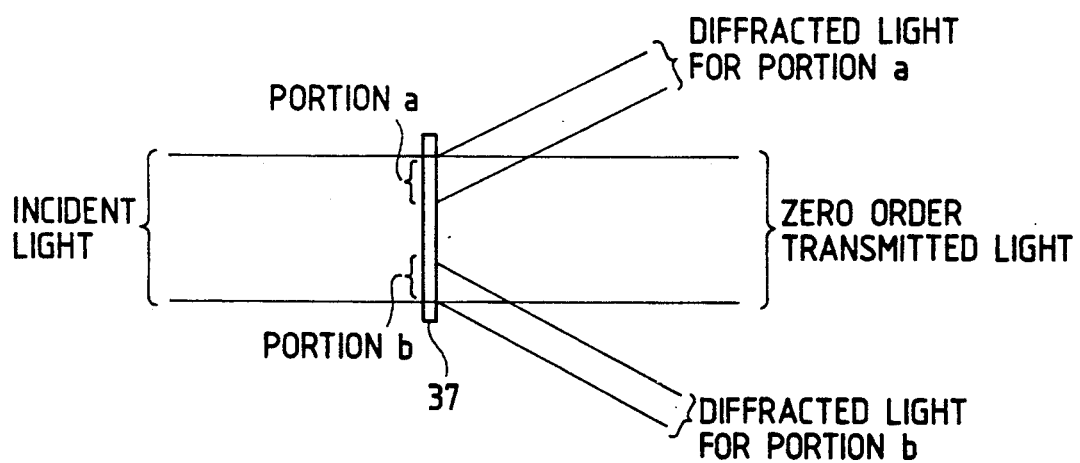
FIG. 4 is a view showing the characteristics of the HOE of the first embodiment.

FIG. 3 is a schematic view of the optical system of a first embodiment of the imaging system having the focus detecting device according to the present invention. This optical system is constructed from a photographic lens 1; a HOE 37 made so that, as depicted in FIG. 4, the portions (a and b) through which two beams of light pass, after traversing different regions in the photographic optical system, have characteristics different from each other; the imaging plane 5; and the light-receiving elements 11, such as photodiode arrays and CCDs, arranged at the positions where images are virtually formed after the two light beams traversing different regions in the photographic optical system are diffracted by the HOE 37. Of these components, the photographic lens 1, HOE 37, and imaging plane 5 constitute the photographic optical system. Further, the photographic lens 1, HOE 37, and light-receiving elements 11 constitute the focus detecting optical system.

In the first embodiment, a convergent beam of light emerging from the photographic lens 1 is incident on the HOE 37 arranged nearly perpendicular to the optical axis and split into zero-order transmitted light and diffracted light by the behavior of the HOE, the zero-order transmitted light being imaged on the imaging plane 5. In this case, the zero-order transmitted light is not subjected to the behavior of the HOE 37, so that even when it travels through the portions having separate characteristics, the situation of the light beam remains unchanged although the amount of light changes. As such, the properties of the image $I_0$ formed on the imaging plane 5 are determined by the photographic lens 1. The diffracted light, on the other hand, forms images $I_5$ $I_6$ on the light-receiving elements 11, respectively. Also, in order to set the imaging position and the imaging performance of the focus detecting optical system, the HOE 37 may well be constructed to have a lens function with respect to the diffracted light.

Figure 5A:
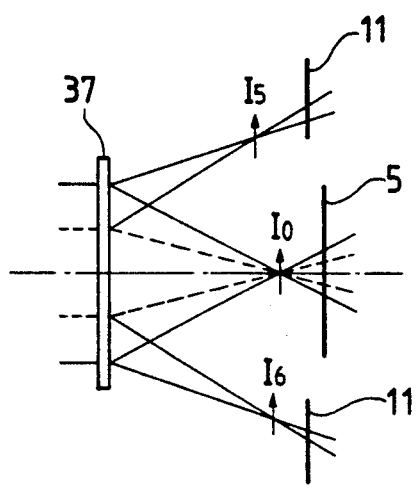
FIGS. 5A to 5C are views showing the principle of a focus detecting method of the first embodiment.
Figure 5B:
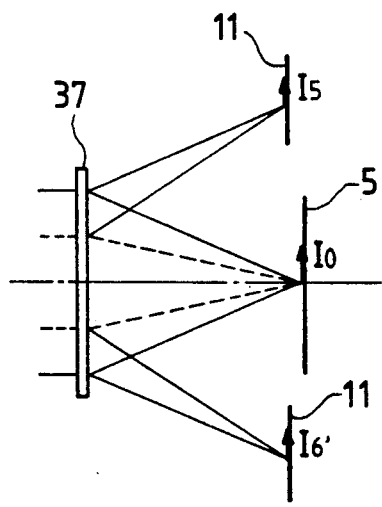
Figure 5C:
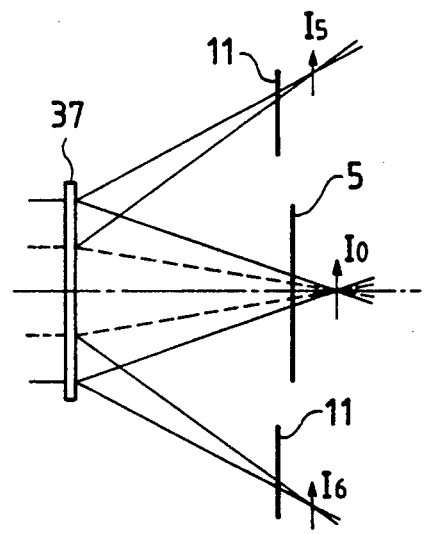

FIG. 5 shows the principle of a focus detecting method of the first embodiment. According to FIG. 5, when the imaging position of the light beam emerging from the photographic lens 1 lies on the object side of the imaging plane 5 (a so-called front focus; FIG. 5A), the positions of incidence on the light-receiving elements 11 are close to the optical axis of the photographic lens 1 as compared with the case where the imaging position coincides with the imaging plane 5 (in-focus; FIG. 5B). Contrary, when the imaging plane 5 lies on the object side of the imaging position of the light beam emerging from the photographic lens 1 (a so-called rear focus; FIG. 5C), the positions of incidence on the light-receiving elements 11 are far from the optical axis of the photographic lens 1 as compared with the case where the imaging position coincides with the imaging plane 5 (in-focus). That is, by detecting the distance between the images $I_5$ and $I_6$, it is possible to detect the in-focus condition, including the amount and direction of defocus, of the photographic lens 1. Specifically, the luminance distributions of the images $I_5$ and $I_6$ formed on the light-receiving elements are detected and an operation is performed to determine the distance between the images.

In the foregoing, the functional principle of the first embodiment has been described. According to the first embodiment, since an extremely simple structure of a single HOE makes it easy to bend, in different directions, two light beams traversing different regions in the photographic optical system and to conduct the light to the imaging plane 5 as well, the arrangement is simplified and the camera body is made compact, with the fact that it is also possible to photograph while focusing is performed.

As an alternative measure for bending, in different directions, two light beams traversing different regions in the photographic optical system, a method using the function of equal refraction of two prisms is available. In this method, however, it is impossible to bring about the zero-order transmitted light as in the HOE 37 and photograph while focusing is performed. Moreover, a means for removing the prisms in photographing is imperatively needed.

Also, If the HOE 37 is constructed so that the optical axis of the photographic lens 1 is located in a plane including a straight line connecting the image $I_5$ with the image $I_6$, the accuracy of focus detection can be improved. Further, if the HOE 37 is designed so that the distance between the images $I_0$ and $I_5$ is identical with that between the images $I_0$ and $I_6$, the accuracy of focus detection can be more greatly increased.

Figure 6:
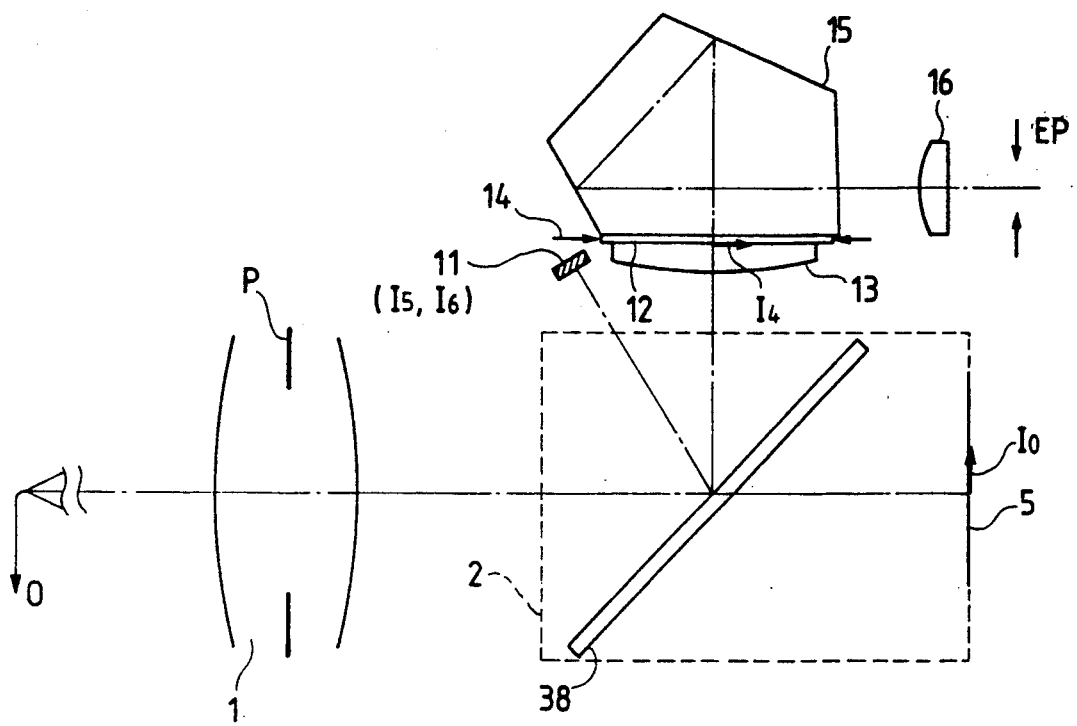
FIG. 6 is a view showing the optical system of a second embodiment.
Figure 7:
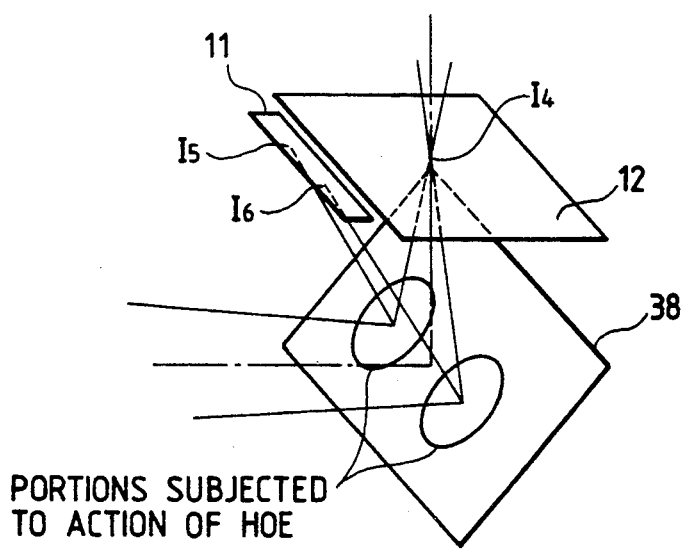
FIG. 7 is a perspective view relative to an instant-return mirror, focusing screen, and light-receiving element in the second embodiment.

FIG. 6 illustrates the optical system of a second embodiment. This optical system comprises the photographic lens 1; a swing-up type instant-return mirror 38 composed of a reflection type HOE, as shown in FIG. 7, pivotally mounted in the mirror box 2 of the photographic optical system, having separate characteristics in the portions of reflections of two light beams traversing a pair of different regions juxtaposed normal to the plane of the figure; the imaging plane 5 arranged, behind the instant-return mirror 38, on the rear face of the mirror box 2; the focusing screen 12, as shown in FIG. 7, lying on the optical path of zero-order reflected light caused by the instant-return mirror 38, arranged at a plane equivalent optically to the imaging plane 5; the condenser lens 13 disposed in front of the focusing screen 12; the field stop 14 disposed at the same position as the focusing screen 12; the pentagonal roof prism 15 whose entrance surface is positioned to the rear of the focusing screen 12; the eyepiece 16 arranged behind the exit surface of the pentagonal roof prism 15; and the light-receiving element 11, as in FIG. 7, approximately arranged at positions of images formed by the diffracted light reflected from the instant-return mirror 38. Of these components, the photographic lens 1 and imaging plane 5 constitute the photographic optical system. Further, the instant-return mirror 38 and light-receiving element 11 constitute the focus detecting optical system on a phase correlation scheme of performing the focus detection by making use of light beams traversing the different areas of the photographic lens 1 to detect the relative positional relationship of a pair of images of an object. Also, the instant-return mirror 38, condenser lens 13, focusing screen 12, field stop 14, pentagonal roof prism 15, and eyepiece 16 constitute the finder optical system.

Specifically, when the instant-return mirror 38 is set at the upper position, the primary image $I_0$ of the object point O is formed on the imaging plane 5 by the photographic lens 1. On the other hand, when the instant-return mirror 38 is set at the lower position, the diffracted light beams, reflected from the instant-return mirror 38, of the imaging light beams through the photographic lens 1 are conducted to the focus detecting optical system, while the zero-order light beams reflected from the instant-return mirror 38 are conducted to the finder optical system.

In the focus detecting optical system, the primary images are received by the light-receiving element 11, so that the field stop like the prior art is not disposed. Additionally, since it is unnecessary to further transmit the primary images, the condenser lens is not required. The function of a pair of apertures of the aperture stop 9 of the prior art shown in FIG. 1 is substituted by the boundary between the portions subjected and not subjected to the action of the HOE. That is, the light beams incident only on the portions subjected to the action of the HOE serves for the focus detecting optical system. Although the function of the separator lens is not required since the convergent light beam is originally used, the HOE may be designed so that the portions subjected to the action of the HOE possess lens functions for the settings of the imaging positions and the imaging performance in the focus detecting optical system. Thus, in the focus detecting optical system, two light beams traversing different regions in the photographic optical system are reflected and diffracted by the portions subjected to the action of the HOE having separate characteristics on the instant-return mirror 38 and form substantially the primary images $I_5$ and $I_6$ on the light-receiving element 11.

For the finder optical system, the light beams reflected from the instant-return mirror 38 are nearly collected by the condenser lens 13 so that the primary image $I_4$ of the object point O, after being formed on the focusing screen 12, is converted into an orthographic image, together with the image of the field stop 14, by the pentagonal roof prism 15, the orthographic image being magnified through the eyepiece 16 for observation at the eyepoint EP.

The optical system of the second embodiment dispenses with the sub-mirror and the field stop, condenser lens, aperture stop, and separator lens in the focus detecting optical system which are necessities for the prior art, thus providing a simple arrangement. Moreover, the arrangement is such that the light is conducted, without any loss of the amount of light, to the finder optical system and the focus detecting optical system.

The HOE is constructed so that the optical axis of the photographic lens 1 is located in a plane intersecting normal to a straight line connecting the image $I_5$ with the image $I_6$ and dividing it into two halves, thereby enabling the accuracy of focus detection to be further increased. If the straight line is positioned parallel to the instant-return mirror 38, the accuracy of focus detection will furthermore be improved.

Figure 8:
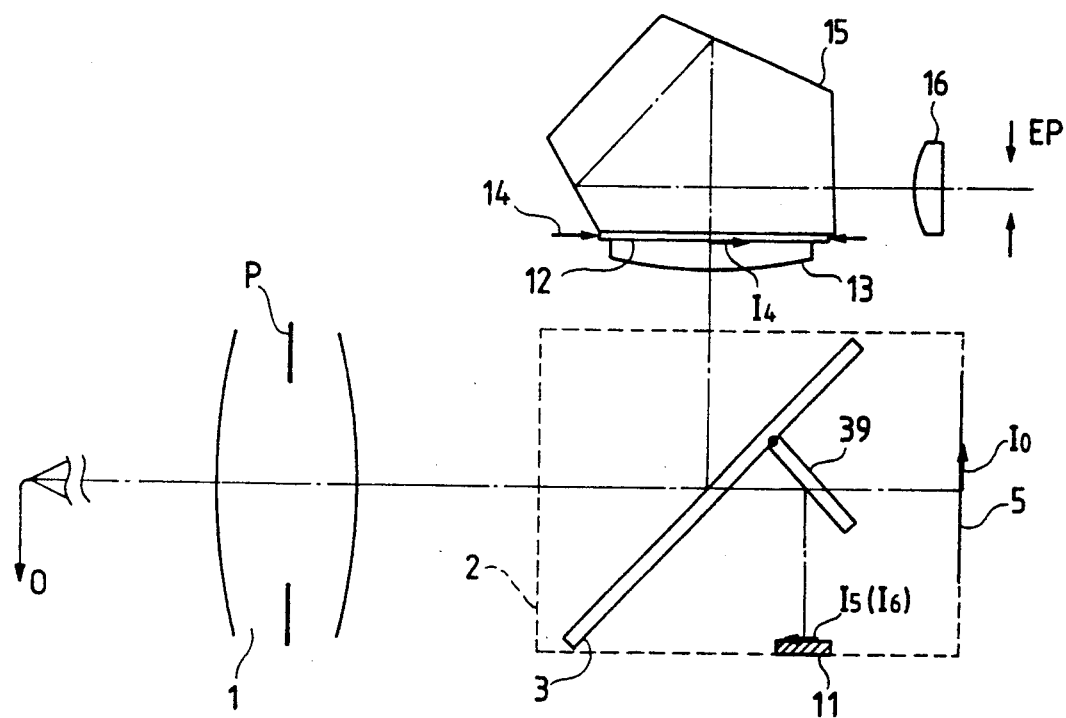
FIG. 8 is a view showing the optical system of a third embodiment.

FIG. 8 depicts the optical system of a third embodiment. This optical system includes the photographic lens 1; the swing-up type instant-return mirror 3 composed of a half mirror, pivotally mounted in the mirror box 2; a sub-mirror 39 pivotally mounted on the back surface of the instant-return mirror 3, located perpendicular to the instant-return mirror 3 when the instant-return mirror 3 is set at the lower position (shown) and coming in close contact with the back surface of the instant-return mirror 3 when the instant-return mirror 3 is shifted to the upper position and composed of a reflection type HOE, having separate characteristics in the portions of reflections of two light beams traversing a pair of different regions juxtaposed normal to the plane of the figure in the photographic optical system; the imaging plane 5 arranged, behind the sub-mirror 39, on the rear face of the mirror box 2; the light-receiving element 11 lying on the optical path of reflection from the sub-mirror 39, arranged at the imaging positions of two light beams traversing different portions in the photographic optical system; the focusing screen 12 lying on the optical path of reflection from the instant-return mirror 3, arranged at a plane equivalent optically to the imaging plane 5; the condenser lens 13 disposed in front of the focusing screen 12; the field stop 14 disposed at the same position as the focusing screen 12; the pentagonal roof prism 15 whose entrance surface is positioned in rear of the focusing screen 12; and the eyepiece 16 arranged behind the exit surface of the pentagonal roof prism 15. Of these components, the photographic lens 1 and imaging plane 5 constitute the photographic optical system. Further, the instant-return mirror 3, sub-mirror 39, and light-receiving element 11 constitute the focus detecting optical system on a phase correlation scheme of performing the focus detection by making use of light beams traversing the different areas of the photographic lens 1 to detect the relative positional relationship of a pair of images of an object. Also, the instant-return mirror 3, condenser lens 13, focusing screen 12, field stop 14, pentagonal roof prism 15, and eyepiece 16 constitute the finder optical system.

Specifically, when the instant-return mirror 3 is set at the upper position, the primary image $I_0$ of the object point O is formed on the imaging plane 5 by the photographic lens 1. On the other hand, when the instant-return mirror 3 is set at the lower position, part of the imaging beams of light through the photographic lens 1 is transmitted by the instant-return mirror 3 and conducted to the focus detecting optical system, while the remainder, reflected from the instant-return mirror 3, is conducted to the finder optical system.

In the focus detecting optical system, the primary images are received by the light-receiving element 11, so that the field stop like the prior art is not disposed. Additionally, since it is unnecessary to further transmit the primary images, the condenser lens is not required. The function of a pair of apertures of the aperture stop 9 of the prior art shown in FIG. 1 is performed by the boundary between the portions subjected and not subjected to the action of the HOE. That is, the light beams incident only on the portions subjected to the action of the HOE serves for the focus detecting optical system. Although the function of the separator lens is not required since the convergent light beam is originally used, the HOE may be designed so that the portions subjected to the action of the HOE possess lens functions for the settings of the imaging positions and the imaging performance in the focus detecting optical system. Thus, in the focus detecting optical system, two light beams traversing different regions in the photographic optical system are reflected and diffracted by the portions subjected to the action of the HOE having separate characteristics on the sub-mirror 39 and form substantially the primary images $I_5$ and $I_6$ on the light-receiving element 11.

For the finder optical system, the light beams reflected from the instant-return mirror 3 are nearly collected by the condenser lens 13 so that the primary image $I_4$ of the object point O, after being formed on the focusing screen 12, is converted into an orthographic image, together with the image of the field stop 14, by the pentagonal roof prism 15, the orthographic image being magnified through the eyepiece 16 for observation at the eyepoint EP.

The optical system of the third embodiment dispenses with the sub-mirror and the field stop, condenser lens, aperture stop, and separator lens in the focus detecting optical system which are necessities for the prior art, thus providing a simple arrangement. In the arrangement of the third embodiment, although the sub-mirror 39 is required which is not disposed in the second embodiment, the light-receiving element 11 is arranged on the opposite side of the focusing screen 12 with respect to the optical axis. This brings about the integration of the light-receiving element 11 and an increase in degree of freedom for the setting of the angle diffraction, providing the arrangement useful for the focusing accuracy.

The HOE is constructed so that the optical axis of the photographic lens 1 is located in a plane intersecting normal to a straight line connecting the image $I_5$ with the image $I_6$ and dividing it into two halves, thereby enabling the accuracy of focus detection to be further increased. If the straight line is positioned parallel to the sub-mirror 39, the accuracy of focus detection will be improved further.

Figure 9:
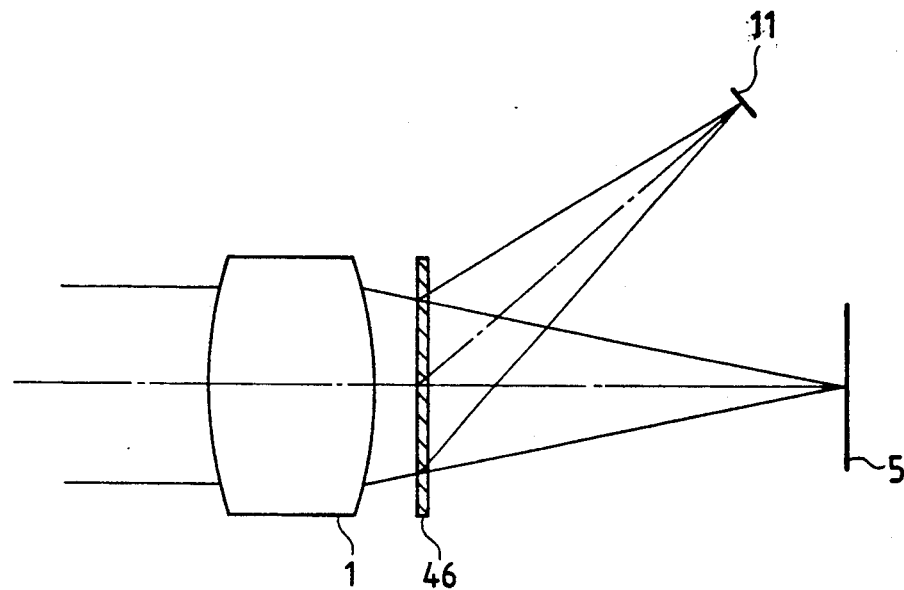
FIG. 9 is a view showing the optical system of a fourth embodiment.

FIG. 9 shows the optical system of a fourth embodiment according to the present invention, in which reference numeral 46 denotes a HOE arranged between the imaging lens 1 and the imaging plane 5. The imaging lens 1, HOE 46, and imaging plane 5 consitute the photographic optical system, and the imaging lens 1, HOE 46, and photoelectric conversion device 11 compose the focus detecting optical system.

Figure 10:
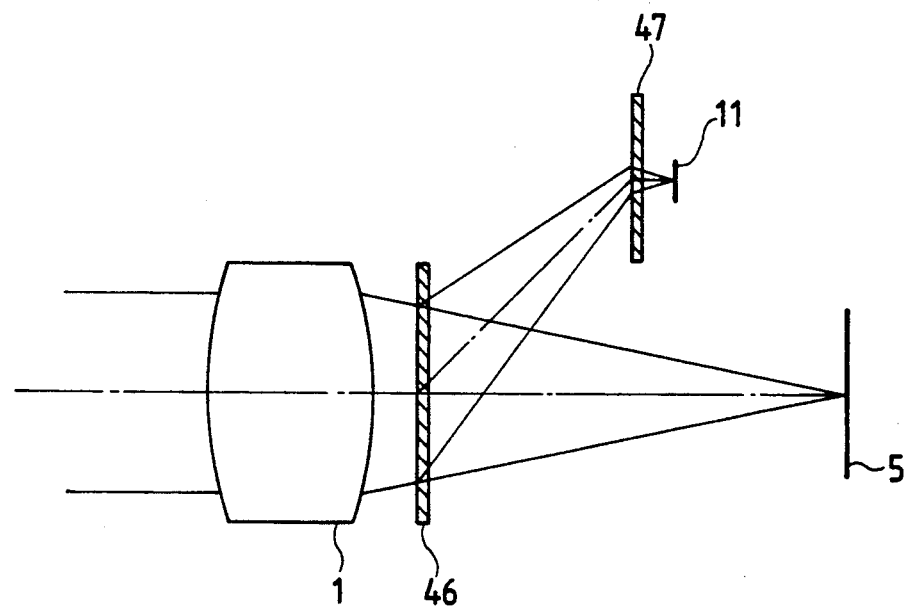
FIG. 10 is a view showing the modified part of the optical system of the fourth embodiment.

In such an optical system, the convergent light beam leaving the imaging lens system 1 enters the HOE 46 arranged nearly perpendicular to the optical axis and is divided into the zero-order transmitted light and the diffracted light due to the behavior of the HOE 46. One divided beam is conducted to the imaging plane 5, while the other is imaged on the photoelectric conversion device 11. In this case, it is desirable that since the zero-order transmitted light little produces chromatic aberration, the light is conducted to the photographic optical system which has a small allowance of the chromatic aberration, whereas the diffracted light liable to produce the chromatic aberration is conducted to the focus detecting optical system which has a relatively large allowance of the chromatic aberration. Further, as shown in FIG. 10, the arrangement of another HOE 47 in the focus detecting optical system makes it possible to correct the chromatic aberration. Specifically, although light with a longer wavelength, of the diffracted light at the HOE 46, is diffracted at a large angle and light with a shorter wavelength at a smaller angle, the optical path of the focus detecting optical system is made nearly parallel to that of the photographic optical system by using the HOE 47, so that the light with a longer wavelength is diffracted, by the HOE 47, on the opposite side of the above at a large angle and the light with a shorter wavelength at a smaller angle and consequently, the chromatic aberration is corrected. Further, since it is also possible to cause the HOE to function as a lens, the HOE 46 may well be constructed to have the lens function as a part of the imaging lens system, and the HOE 47 for the setting of the imaging position in the focus detecting optical system.

Figure 11:
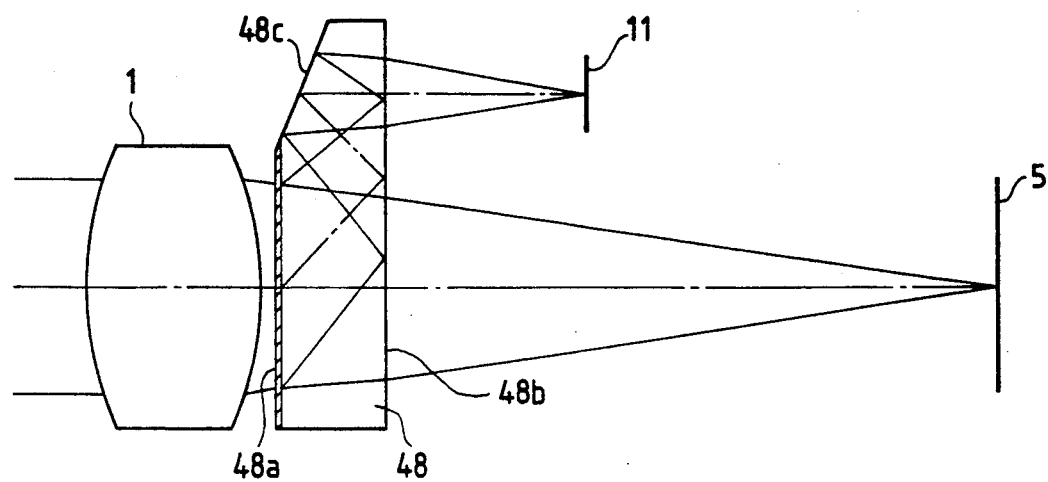
FIGS. 11 and 12 are views showing the optical systems of fifth and sixth embodiments, respectively.

FIG. 11 illustrates the optical system of a fifth embodiment, in which a prism 48 whose surface 48a directed toward the object is constructed of the HOE is arranged between the imaging lens system 1 and the imaging plane 5. In such an optical system, the convergent light beam leaving the imaging lens system 1 enters the surface 48a arranged practically perpendicular to the optical axis and is divided into the zero-order transmitted light and the diffracted light by virtue of the behavior of the HOE. The zero-order transmitted light is transmitted through a surface 48b practically perpendicular to the optical axis and enters the imaging plane 5. The diffracted light, on the other hand, after being totally reflected at the surface 48b, is further reflected from a rear surface 48c and emerges perpendicularly from the exit surface configured on the same surface as the surface 48a, being then incident on the photoelectric conversion device 11. In this case, the prism 48 need not be configured as a divided prism and can be integrally constructed. Further, if the surface 48a is somewhat inclined with respect to the vertical of the optical axis, the range of the incident angles at which the diffracted light is totally reflected on the surface 48a will be extended and the diffracted angles can also be reduced.

Figure 12:
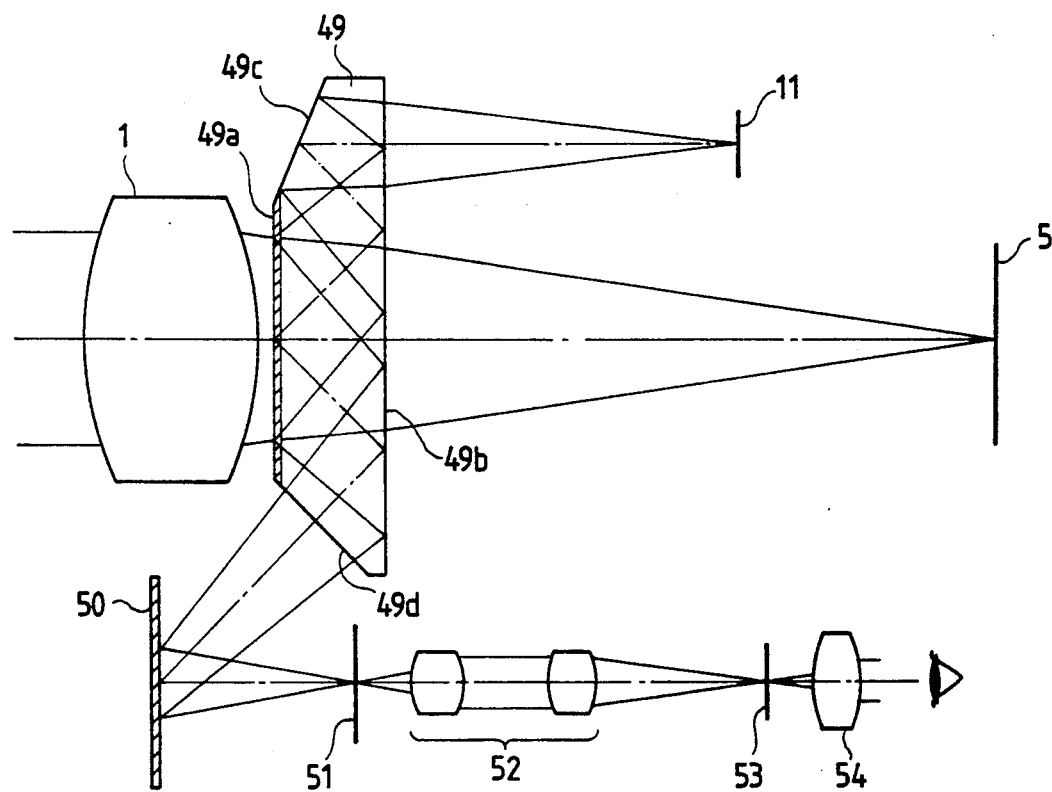

FIG. 12 shows the optical system of a sixth embodiment. In this figure, reference numeral 49 represents a prism which is arranged between the imaging lens 1 and the imaging plane 5 and whose surface 49a on the object side is constructed of the HOE; 50 a reflection type HOE; 51 a focusing screen; 52 an observation system relay lens; 53 a secondary imaging plane; and 54 an eyepiece. Here, the imaging lens system 1, prism 49, and imaging plane 5 constitute the photographic optical system; the imaging lens system 1, prism 49, and photoelectric conversion device 11 the focus detecting optical system; the imaging lens system 1, prism 49, HOE 50, focusing screen 51, observation system relay lens 52, secondary imaging plane 53, and eyepiece 54 the finder optical system. Also, the HOE of the surface 49a of the prism 49 is designed so that the incident beam is split into zero-order transmitted light, + first-order diffracted light, and − first-order diffracted light.

In such an optical system, the convergent light beam leaving the imaging lens system 1 enters the surface 49a arranged nearly perpendicular to the optical axis and is split, in virtue of the function of the HOE, into the zero-order transmitted light, + first-order diffracted light, and − first-order diffracted light. The zero-order transmitted light is then conducted to the imaging plane 5. The +first-order diffracted light, after total reflection at a surface 49b, is further reflected from a surface 49c and emerges nearly perpendicularly from the exit surface configured on the same surface as the surface 49b, being then incident on the photoelectric conversion sevice 11. The − first-order diffracted light, on the other hand, after being totally reflected from the surface 49b, emerges from a surface 49d, is corrected, at the reflection type HOE 50, for chromatic aberration produced by the HOE of the surface 49a to be imaged on the focusing screen 51, and formed as an image on the secondary imaging plane 53 by the observation system relay lens 52, which is observed through the eyepiece 54. Thus, this arrangement makes it possible to perform not only focusing during the photography, but also observation through the finder. In this instance, it is favorable that the reflection type HOE 50 is constructed so that at a low rate of the zero-order light, most of the light beam is changed to the first-order diffracted light. Further, if the arrangement is such that chromatic aberration is corrected through the whole of the imaging lens system and the finder optical system, it can do away with the need of the reflection type HOE 50.

What is claimed is:

1. An imaging system, comprising:
an objective lens for forming an image of an object;
a finder optical system; and
photoelectric conversion means for receiving first and second images formed by first and second beams of light passing through different portions of the objective lens;
wherein focus detection is performed in accordance with a phase difference between output signals representing intensity distributions of light of the first and second images obtained from the photoelectric conversion means; and
wherein said imaging system further comprises reflecting means obliquely disposed behind said objective lens for reflecting at least part of the light transmitted through said objective lens toward said finder optical system, said reflecting means having first and second holographic optical elements on a surface thereof, each of said first and second holographic elements for splitting incident light into a plurality of beams for reflection, wherein one of said plurality of beams is incident on the finder optical system and the other beam is incident on said photoelectric conversion means so that the first and second images are directly formed through said two holographic optical elements on said photoelectric conversion means.

2. An imaging system, comprising:
an objective lens for forming an image of an object;
a finder optical system; and
photoelectric conversion means for receiving two images formed by two beams of light passing through different portions of the objective lens;
wherein focus detection is performed in accordance with a phase difference between output signals representing intensity distributions of light of the two images obtained from the photoelectric conversion means,
wherein said imaging system further comprises reflecting means obliquely disposed behind said objective lens for transmitting a part of light transmitted through said objective lens, and auxiliary reflecting means attached to said reflecting means for reflecting the part of light transmitted through said reflecting means, said auxiliary reflecting means having holographic optical element so that the two images are directly formed through said holographic optical elements onto said photoelectric conversion means.

3. The imaging system according to claim 1 or 2, wherein zero-order diffracted light, of beams split by said holographic element, is conducted to an imaging plane for photographing an image of an object.

4. The imaging system according to claim 1 or 2, wherein said imaging system includes a holographic element in an optical path of said finder optical system, said holographic optical element splitting the beam of light into a plurality of beams and zero-order diffracted light, of beams, said plurality of beams being conducted to an observer's pupil.

* * * * *